United States Statutory Invention Registration [19]

[11] Reg. Number: H475

Lawson et al.

[43] Published: Jun. 7, 1988

[54] PREPARING AN AQUEOUS ALKALINE SOLUTION FOR RECOVERY OF OIL FROM A RESERVOIR CONTAINING HARD WATER

[75] Inventors: Jimmie B. Lawson; David R. Thigpen; Richard C. Nelson; Jeffery G. Southwick, all of Houston, Tex.

[73] Assignee: Shell Oil Company, Houston, Tex.

[21] Appl. No.: 922,666

[22] Filed: Oct. 24, 1986

[51] Int. Cl.[4] ..... E21B 43/22

[52] U.S. Cl. ..... 166/270; 252/8.554

[58] Field of Search ..... 166/270, 271, 273, 274, 166/275; 252/8.554

[56] References Cited

U.S. PATENT DOCUMENTS

| | | | |
|---|---|---|---|
| 3,175,610 | 3/1965 | Osoba | 166/270 |
| 3,330,347 | 7/1967 | Brown et al. | 166/270 |
| 3,398,791 | 8/1968 | Hurd | 166/270 |
| 3,871,452 | 3/1975 | Sarem | 166/270 |
| 4,004,638 | 1/1977 | Burdyn et al. | 166/273 |
| 4,466,892 | 8/1984 | Chan et al. | 166/270 X |
| 4,502,541 | 3/1985 | Lawson et al. | 166/270 X |
| 4,526,231 | 7/1985 | Radke | 166/270 |
| 4,609,044 | 9/1986 | Lau | 166/270 |

*Primary Examiner*—Stephen C. Buczinski
*Assistant Examiner*—Linda J. Wallace

[57] ABSTRACT

An aqueous alkaline oil recovery fluid containing monovalent salt, and, optionally, preformed cosurfactant, is improved by using a mixture of alkaline silicate and carbonate salts in specified proportions as the alkaline material.

4 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

PREPARING AN AQUEOUS ALKALINE SOLUTION FOR RECOVERY OF OIL FROM A RESERVOIR CONTAINING HARD WATER

RELEVANT APPLICATION

The present application is relevant to the commonly assigned patent application Ser. No. 797,340 filed Nov. 12, 1985 by D. R. Thigpen, J. B. Lawson and R. C. Nelson. That application, relates to recovering oil by displacing it with an aqeuous alkaline solution which contains a stoichometric excess of alkaline material and cosurfactant material such that, upon reacting with the reservoir oil, the solution forms a surfactant system having a salinity requirement that minimizes the interfacial tension between it and the oil.

BACKGROUND OF THE INVENTION

The present invention relates to an aqueous alkaline solution for use in recovering oil from a reservoir which contains significant quantities of clay in the calcium and magnesium form and significant proportions of water soluble calcium and magnesium salts. More particularly, the invention relates to a process of tailoring the alkalinity of such an alkaline solution to enhance the performance of surfactant materials by suppressing their exposure to calcium and magnesium ions.

Numerous processes have been proposed for recovering oil by displacing it with aqueous alkaline solutions. For example, such processes are described in the following patents: U.S. Pat. No. 3,771,817 describes injecting an aqueous alkaline solution for satisfying surfactant adsorption sites on a reservoir rock and then injecting a surfactant containing aqueous liquid that may also contain alkali. U.S. Pat. Nos. 3,804,170, 3,804,171 and 3,847,823 describe injecting aqueous alkaline solutions containing overbased petroleum sulfonate surfactants formed by overneutralizing petroleum hydrocarbon sulfonates. U.S. Pat. No. 3,927,716 describes injecting an aqueous alkaline solution to neutralize the organic acids in the oil and form surfactants in situ with the solution having a specified pH and concentration of neutral monovalent salt. U.S. Pat. Nos. 3,997,470 and 4,004,638 describe first injecting an aqueous alkaline solution and then an alkaline solution containing a preformed surfactant. U.S. Pat. No. 4,468,892 describes alkaline flood using water such as seawater which contains multivalent ions that have been stabilized by adding a lignosulfonate before adding the alkali.

Alkaline floods have been conducted by many different companies over the years in attempts to recover more oil than could be recovered by simple water flooding. Alkaline materials such as sodium hydroxide, sodium orthosilicate, sodium carbonate and ammonia have been used in such waterfloods. But, as far as Applicants are aware, the alkaline materials have been used individually, although mentions such that "use could be made of substantially any" of a list of materials "and/or mixtures thereof" may be found in patents. In addition, in at least some sense, any such use of an aqueous, e.g., sodium orthosilicate involves using a mixture of a sodium silicate and sodium hydroxide. And, it appears that no one has previously discovered a benefit which can be provided by an aqueous alkali containing a reservoir-tailored mixture of alkali metal carbonates and silicates.

SUMMARY OF THE INVENTION

The present invention relates to improving a process for recovering oil by injecting an aqueous alkaline solution into a reservoir to form surfactant soaps of the reservoir petroleum acids and displace oil toward a production location. The improvement solves a problem presented by an oil-containing reservoir in which calcium and magnesium ions dissolve in the alkali from calcium and magnesium ions either in solution in fluid in the reservoir or adsorbed on clays and lower the solubility of the surfactants. The present process comprises using as the alkali in the aqueous alkaline solution a mixture of water-soluble carbonates and silicates. Enough silicate is included to precipitate most of the magnesium ions.

DESCRIPTION OF THE PREFERRED EMBODIMENT

In an alkaline flooding process, the alkali forms surface-active soaps of petroleum acids present in the crude oil. In most alkaline floods the surface-active petroleum soaps exist as ionized monovalent salts such as sodium salts. However, when the calcium or magnesium ion concentration becomes high enough to exceed the solubility of the calcium or magnesium salts of the surfactant soaps or other surfactants in the alkaline solution, such salts will precipitate and the alkaline flooding process will lose its effectiveness. Even before precipitation occurs, calcium and magnesium ions damage the performance of an alkaline flood by driving the surfactant system "over optimum" in chemical flooding parlance (for example, as described in the related patent application Ser. No. 797,340).

Table 1 illustrates problems of an alkaline flooding process in which the alkali anions consist essentially of a single species.

TABLE 1

| | Solubility Product* | Approx. Solubility in Fresh Water (ppm) |
|---|---|---|
| Calcium Hydroxide | $8 \times 10^{-6}$ | 1250 |
| Magnesium Hydroxide | $6 \times 10^{-12}$ | 5 |
| Calcium Carbonate | $5 \times 10^{-9}$ | 5 |
| Magnesium Carbonate | $1 \times 10^{-5}$ | 250 |
| Calcium Silicate | Low | Low |
| Magnesium Silicate | Low | Low |

*Values from Latimer and Hildebrand, Reference Book of Inorganic Chemistry, Revised Edition, Macmillan, New York (1940).

When sodium hydroxide is the only alkali, the solubility product of magnesium hydroxide assures that very little magnesium will be in solution, but enough calcium may be in solution to significantly reduce the effectiveness of the surfactant system. When the only alkali is sodium carbonate, the low solubility product of calcium carbonate assures that little calcium will be in solution, but enough magnesium may be dissolved to reduce the effectiveness of the system. The solubility products for calcium and magnesium silicate are known to be very low.

Table 2 lists cosurfactant adsorption data. It illustrates a discovery by Applicants of the extent to which magnesium may be a problem in an alkaline solution in which the alkali is sodium carbonate alone, but not a problem when the alkali is sodium silicate alone. The data was obtained by measuring static bottle adsorption experiments of the amount of olefin sulfonate cosurfactant adsorbed on three sands from two types of enhanced alkaline slugs. The Clemtex sand was a pure silica sand containing essentially no clays and essentially no calcium or magnesium. The crushed Berea sandstone contained sufficient clay to furnish about 4000 ppm of calcium and 2500 ppm of magnesium. The washed Berea sand was prepared by washing the crushed Berea sand with sodium chloride solutions until most of the calcium and magnesium on the clays had been exchanged with sodium. The silicate solution contained 1.55% w of sodium metasilicate, 0.0114 meq/g of an olefin sulfonate cosurfactant and 1.0% w of sodium chloride. The carbonate solution contained 2.65% w of sodium carbonate, 0.0114 meq/g of an olefin sulfonate cosurfactant and 0.3% w of sodium chloride. Both alkaline solutions contained the same concentration of sodium ions.

TABLE 2

| Sand | Alkali | Amount of Cosurfactant Adsorbed (meq/100 g Sand) |
|---|---|---|
| Clemtex | Sodium Metasilicate | 0.011 |
| Clemtex | Sodium Carbonate | 0.018 |
| Berea | Sodium Metasilicate | 0.013 |
| Berea | Sodium Carbonate | 0.091 |
| Washed Berea | Sodium Metasilicate | 0.014 |
| Washed Berea | Sodium Carbonate | 0.035 |

The adsorption data in Table 2 are consistent with the following picture: Adsorption of the cosurfactant on the Clemtex was low from both alkalis due to the absence of clay and virtual absence of calcium and magnesium ions. Adsorption of the cosurfactant on the Berea sand was much higher when sodium carbonate was the alkali than when sodium silicate was the alkali due to the greater solubility of magnesium ions in the sodium carbonate solution. Since the magnesium salt of the cosurfactant used is less soluble than the sodium salt of that surfactant, the adsorption of the cosurfactant increases in the presence of magnesium even though the point of actual precipitation may not have been reached. Washing the Berea sand reduced adsorption of the cosurfactant from the slug in which sodium carbonate was the alkali because the magnesium content of the sand was lower after washing.

The data presented in Tables 1 and 2 might suggest that sodium silicate is simply a better choice of alkali than sodium carbonate. However, sodium silicate is considerably more expensive than sodium carbonate, and sodium silicate participates to a much greater extent than sodium carbonate in alkali-wasteful clay transformation reactions. In view of this, the present process is significantly more cost effective than, for example, a process in which the alkali consists essentially of a silicate.

Table 3 lists the data from two enhanced alkaline floods conducted in Berea sand packs. They are illustrative of the superiority of using a mixture of sodium carbonate and sodium silicate rather than sodium carbonate alone. The potential effect of magnesium was exaggerated by first washing the sand with magnesium chloride solution to convert a high proportion of the clays to the magnesium form. The floods were conducted in 2-inch diameter, 12-inch long tubes at 140° F. using a flow rate of approximately 1 foot per day. The sequence of fluids which passed through each of the sand packs, the compositions of the aqueous alkaline waterflood fluids and the flood results were as follows:

1. Multiple pore volumes of a 1.0 percent solution of magnesium chloride hexahydrate.
2. Ten percent (10%) of a pore volume of a 3.32 percent solution of sodium chloride to separate the enhanced alkaline slug from the magnesium chloride solution. (Some of the magnesium clays were unavoidably converted back to the sodium form by this solution.)
3. Thirty percent (30%) of a pore volume of enhanced alkaline slug.
4. One hundred and seventy percent (170%) of a pore volume of 3.32 percent solution of sodium chloride.

TABLE 3

| | Carbonate Flood | Carbonate-Silicate Flood |
|---|---|---|
| Composition: | | |
| Sodium Carbonate, % w | 2.65 | 2.00 |
| Sodium Silicate ($Na_2O*2SiO_2$), % w | — | 0.50 |
| Cosurfactant, meq/g | 0.0114 | 0.0114 |
| Deionized Water | Balance | Balance |
| Waterflood Residual Oil Saturation, % Pore Volume: | 25 | 24 |
| Oil Recovered by 1 Pore Volume of Slug/Drive: | | |
| Percent of Waterflood Residual Oil | 40 | 43 |
| Remaining Oil Saturation, % Pore Volume | 15 | 14 |
| Oil Recovered by 2 Pore Volumes of Slug/Drive: | | |
| Percent of Waterflood Residual Oil | 52 | 67 |
| Remaining Oil Saturation, % Pore Volume | 12 | 8 |

The superiority of the carbonate-silicate flood is apparent, particularly during the second pore volume of the flooding.

Composition and Procedures

Substantially any sodium, or other alkali metal or ammonium, silicates (which are available at different silicon dioxide to alkali metal oxide ratios, such as about 1.6 to 3.2 $SiO_2$ to $Na_2O$, can be used in the process of the present invention. In general, sodium silicates with a weight ratio of silicon dioxide to sodium oxide less than 2.0 raise the pH when added to an 0.25 molar solution of sodium carbonate. Since the rates of some of the alkali-wasteful clay transformation reactions within a reservoir formation increase with increasing pH, the pH should be kept as low as the alkaline flooding process allows. A particularly suitable alkali metal silicate is a sodium silicate with a silicon dioxide to sodium oxide ratio of about 2.0. Such a silicate suppresses magnesium solubility without increasing the pH to significantly more than what would be obtained with sodium carbonate as the sole alkali. In general, the concentration of a silicate, such as sodium silicate, required to suppress the solubility of magnesium to a significant degree will depend on the quantity of aqueous alkaline solution to be injected and will generally be equal to about 10 to 50 percent of the carbonate alkalinity on a molar basis.

When an aqueous alkaline solution contacts a crude oil that contains a significant amount of petroleum acids, surfactants are formed in situ. Such surfactants are essentially soaps of the petroleum acid components of the oil and are capable of producing a low interfacial tension between the oil and the aqueous solution. How low that interfacial tension will be is affected by factors inclusive of the temperature of the reservoir, the kind and amount of petroleum acid components contained in the reservoir oil, the kind and concentration of alkali in the alkaline solution, the kind and amount of electrolyte dissolved in the injected alkaline solution, the kind and amount of electrolytes dissolved in the water in the reservoir, the properties of the reservoir oil, and the like.

In a situation in which the above factors are capable of resulting in a salinity requirement of the crude oil to the alkaline petroleum acid soap system which, in the absence of calcium and magnesium ions, is high enough to support a reasonable concentration of alkali, the aqueous alkaline solution injected in accordance with the present process can consist essentially of only the mixture of monovalent water-soluble carbonates and silicates—without a preformed cosurfactant. In general, however, the present process is preferably employed in conjunction with a preformed cosurfactant-containing system of the type described in the relevant patent application Ser. No. 797,340, filed Nov. 12, 1985 listed above.

Where a preformed cosurfactant material is used, it should be capable of increasing the salinity requirement of the surfactant system to be formed within the reservoir in contact with the reservoir oil and at reservoir temperature. This can conveniently be tested in the manner described in the SPE Paper No. 8824 by R. C. Nelson, et al. In general, such preformed cosurfactants are amphiphilic compounds which have a solubility in an alkaline brine solution, relative to their solubility in the oil, which is greater than the solubility of the petroleum soaps (generated by the interaction of the alkali solution and the oil) in the alkaline brine solution relative to their solubility in the oil. Numerous examples of suitable preformed cosurfactants are described in the related patent application. Particularly suitable cosurfactants comprise internal olefin sulfonate surfactants prepared by sulfonating olefinic hydrocarbons having a high content of internal olefins in the $C_{10}$ to $C_{24}$ range.

Water-thickening agents which can suitably be used in the present process comprise any water-soluble or water-dispersable polymeric material which (a) are capable of increasing the viscosity of an aqueous solution within the reservoir, (b) do not react detrimentally with other components of the injected aqueous alkaline solution and the surfactant system it forms within the reservoir. Examples of such thickeners include Xanthan gum polymers such as Xanflood QC-128, (available from Kelco Chemical Company), the Polytran water-thickeners (available from Pillsbury Company), the acrylamine polymeric materials such as Pusher chemicals (available from Dow Chemical Company), and the like.

In general, substantially any monovalent water-soluble carbonate or silicate compounds can be utilized to provide the mixture of carbonates and silicates used in the present invention. The alkali metal salts, and particularly the sodium salts of such compounds, are preferred. The carbonates, such as sodium carbonate of the formula $Na_2CO_3$, can include some hydrogen ion-containing bicarbonates, such as sodium bicarbonate of the formula $NaHCO_3$.

What is claimed is:

1. In a process for recovering oil by injecting an aqueous alkaline solution into a reservoir to form petroleum acid soaps and displace oil toward a production location, an improvement for enhancing the efficiency of the process in a reservoir containing enough magnesium ions, either in solution or adsorbed on clays, to at least significantly decrease the solubility of surfactant materials within the alkaline solution, comprising:

using as the injected aqueous alkaline liquid an aqueous solution of monovalent carbonate and silicate salts which predominates in carbonate salt but contains enough silicate salt to suppress the solubility of magnesium.

2. The process of claim 1 in which the injected aqueous alkaline liquid contains an amphiphilic compound having a solubility in that aqueous liquid which, relative to its solubility in oil, is greater than the solubility of said petroleum acid soaps in that liquid.

3. The process of claim 1 in which monovalent carbonate salt is sodium carbonate and the monovalent silicate salt is sodium silicate with a weight ratio of silicon dioxide to sodium oxide of about 2.0.

4. A process for preparing an aqueous alkaline solution to be injected into a reservoir to form soaps from a relatively acidic reservoir oil and displace the oil towards a production location in spite of the reservoir containing enough soluble magnesium ions, either in solution or adsorbed on clays, to significantly decrease the solubility of surfactants in the alkaline solution, comprising:

selecting for use as the alkaline component of said alkaline solution a mixture of monovalent water-soluble carbonate salts and silicate salts; and providing a molar ratio of the selected salts which predominates in carbonate salts but contains enough silicate salts to significantly suppress the introduction of magnesium ions into the alkaline solution.

* * * * *